US008495310B2

(12) United States Patent
Gregorius et al.

(10) Patent No.: US 8,495,310 B2
(45) Date of Patent: *Jul. 23, 2013

(54) METHOD AND SYSTEM INCLUDING PLURAL MEMORY CONTROLLERS AND A MEMORY ACCESS CONTROL BUS FOR ACCESSING A MEMORY DEVICE

(75) Inventors: Peter Gregorius, München (DE); Thomas Hein, München (DE); Martin Maier, Dießen (DE); Hermann Ruckerbauer, Moos (DE); Thilo Schaffroth, Röhrmoos (DE); Ralf Schedel, Starnberg (DE); Wolfgang Spirkl, Germering (DE); Johannes Stecker, München (DE)

(73) Assignee: Qimonda AG, Munich (DE)

( * ) Notice: Subject to any disclaimer, the term of this patent is extended or adjusted under 35 U.S.C. 154(b) by 968 days.

This patent is subject to a terminal disclaimer.

(21) Appl. No.: 12/235,063

(22) Filed: Sep. 22, 2008

(65) Prior Publication Data
US 2010/0077157 A1    Mar. 25, 2010

(51) Int. Cl.
*G06F 13/36* (2006.01)
*G06F 13/16* (2006.01)

(52) U.S. Cl.
USPC ........... 711/151; 711/105; 711/149; 711/158; 710/107; 710/244

(58) Field of Classification Search
USPC ......... 711/105, 149, 151, 158, 5; 365/230.03; 710/107, 244
See application file for complete search history.

(56) References Cited

U.S. PATENT DOCUMENTS

| 5,261,059 | A | | 11/1993 | Hedberg et al. |
| 5,408,627 | A | * | 4/1995 | Stirk et al. ................. 711/151 |
| 5,895,487 | A | | 4/1999 | Boyd et al. |
| 6,026,464 | A | * | 2/2000 | Cohen ............................. 711/5 |
| 6,055,609 | A | * | 4/2000 | Ahmadian ................... 711/147 |
| 6,137,730 | A | * | 10/2000 | Chien ...................... 365/189.02 |
| 6,138,219 | A | | 10/2000 | Soman et al. |
| 6,141,765 | A | | 10/2000 | Sherman |
| 6,504,785 | B1 | * | 1/2003 | Rao .......................... 365/230.05 |

(Continued)

FOREIGN PATENT DOCUMENTS

EP    1944697 A1 * 7/2008

OTHER PUBLICATIONS

Office Action for U.S. Appl. No. 12/235,596 dated Aug. 25, 2011.

*Primary Examiner* — Sanjiv Shah
*Assistant Examiner* — Glenn Gossage
(74) *Attorney, Agent, or Firm* — Patterson & Sheridan, LLP

(57) ABSTRACT

A system and method utilize a memory device that may be accessed by a plurality of controllers or processor cores via respective ports of the memory device. Each controller may be coupled to a respective port of the memory device via a data bus. Each port of the memory device may be associated with a predefined section of memory, thereby giving each controller access to a distinct section of memory without interference from other controllers. A common command/address bus may couple the plurality of controllers to the memory device. Each controller may assert an active signal on a memory access control bus to gain access to the command/address bus to initiate a memory access. In some embodiments, a plurality of memory devices may be arranged in a memory package in a stacked die memory configuration.

28 Claims, 10 Drawing Sheets

U.S. PATENT DOCUMENTS

| | | |
|---|---|---|
| 6,717,882 B1 | 4/2004 | Dhong et al. |
| 6,877,071 B2 * | 4/2005 | Sherman ........................ 711/149 |
| 2002/0039320 A1 | 4/2002 | Choi et al. |
| 2003/0172225 A1 * | 9/2003 | Brown .......................... 711/104 |
| 2006/0149872 A1 * | 7/2006 | Natarajan et al. ............... 710/74 |
| 2006/0280022 A1 | 12/2006 | Kono et al. |
| 2007/0043922 A1 * | 2/2007 | Lee ............................... 711/167 |
| 2007/0070794 A1 * | 3/2007 | Lee et al. ........................ 365/233 |
| 2007/0086228 A1 * | 4/2007 | Choi ................................ 365/63 |
| 2007/0150667 A1 * | 6/2007 | Bains et al. .................... 711/149 |
| 2007/0153588 A1 * | 7/2007 | Janzen ..................... 365/189.03 |
| 2008/0172500 A1 * | 7/2008 | Im .................................. 710/26 |
| 2010/0077139 A1 | 3/2010 | Gregorius et al. |

\* cited by examiner

|  | SECTION $510_1$ | SECTION $510_2$ | SECTION $510_3$ | SECTION $510_4$ |
|---|---|---|---|---|
| $T_{A_2}$ | 0 | 1 | 0 | 1 |
| $T_{A_1}$ | 0 | 0 | 1 | 1 |
| $A_4$ | 1 | 0 | 0 | 0 |
| $A_3$ | 0 | 1 | 0 | 0 |
| $A_2$ | 0 | 0 | 1 | 0 |
| $A_1$ | 0 | 0 | 0 | 1 |

FIG. 6

METHOD AND SYSTEM INCLUDING PLURAL MEMORY CONTROLLERS AND A MEMORY ACCESS CONTROL BUS FOR ACCESSING A MEMORY DEVICE

This application is related to U.S. patent application Ser. No. 12/235,396, entitled MULTI-PORT DRAM ARCHITECTURE, filed Sep. 22, 2008, by Peter Gregorius et al.

BACKGROUND OF THE INVENTION

Modern computer systems typically include at least one processor and at least one memory device which stores information accessed by the processor. During operation of the system, the processor may issue access commands to the memory device to access the stored information. The access commands issued by the processor may include, for example, read commands and write commands. For each received access command, the memory device may process the command and access a desired location in a memory array contained in the memory device.

In systems where a single processor requires a large amount of memory to store data, a plurality of memory devices may be coupled with the processor to provide adequate storage space. In other systems, a plurality of processors may be included, wherein each processor performs a particular task. For example, in a mobile device such as a cell phone, a first processor may be configured to control telephone calls, a second processor may be configured to facilitate text messaging, a third processor may be configured to play music, and so on. Each processor may have its own respective memory device for storing information accessed by the processor.

SUMMARY OF THE INVENTION

The present invention is generally related to memory devices, and more specifically to memory devices that may be accessed by a plurality of controllers or processor cores via respective ports of the memory device.

One embodiment of the invention is directed to a system generally comprising a plurality of memory controllers and at least one memory device. Two or more of the memory controllers are configured to access the at least one memory device, each of the two or more memory controllers being coupled with the at least one memory device via at least one respective data bus.

Another embodiment of the invention is directed to a method for accessing a memory device by a first controller of a plurality of controllers of a system. The method generally comprises determining, by the first controller, whether a shared command/address (CA) bus coupling the plurality of the controllers to the memory device is available, and upon determining that the CA bus is available, asserting, by the first controller, an active signal indicating to the plurality of system controllers that the CA bus is unavailable. The method further comprises accessing the CA bus by transferring command and address signals to the memory device.

Yet another embodiment of the invention is directed to a memory controller coupled with a first one of a plurality of data ports of a memory device via a data bus, a shared command/address (CA) bus coupling a plurality of controllers to the memory device, and a memory access control bus coupling the memory controller to each of the plurality of controllers and the memory device. The memory controller is generally configured to determine whether the CA bus is available, and upon determining that the CA bus is available, assert an active signal on the memory access control bus indicating to the plurality of controllers that the CA bus is unavailable. The memory controller is further configured to access the CA bus by transferring command and address signals to the memory device via the CA bus.

A further embodiment of the invention is directed to a system generally comprising a plurality of memory controllers and at least one memory package comprising a plurality of memory devices. Each of the plurality of memory controllers is configured to access a respective one of the plurality of memory devices in the package, each memory controller being coupled with the memory package via a respective data bus.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 illustrates an exemplary table for deriving a section address from active signals generated by controllers, according to an embodiment of the invention.

DETAILED DESCRIPTION OF THE PREFERRED EMBODIMENT

Figure 1A:
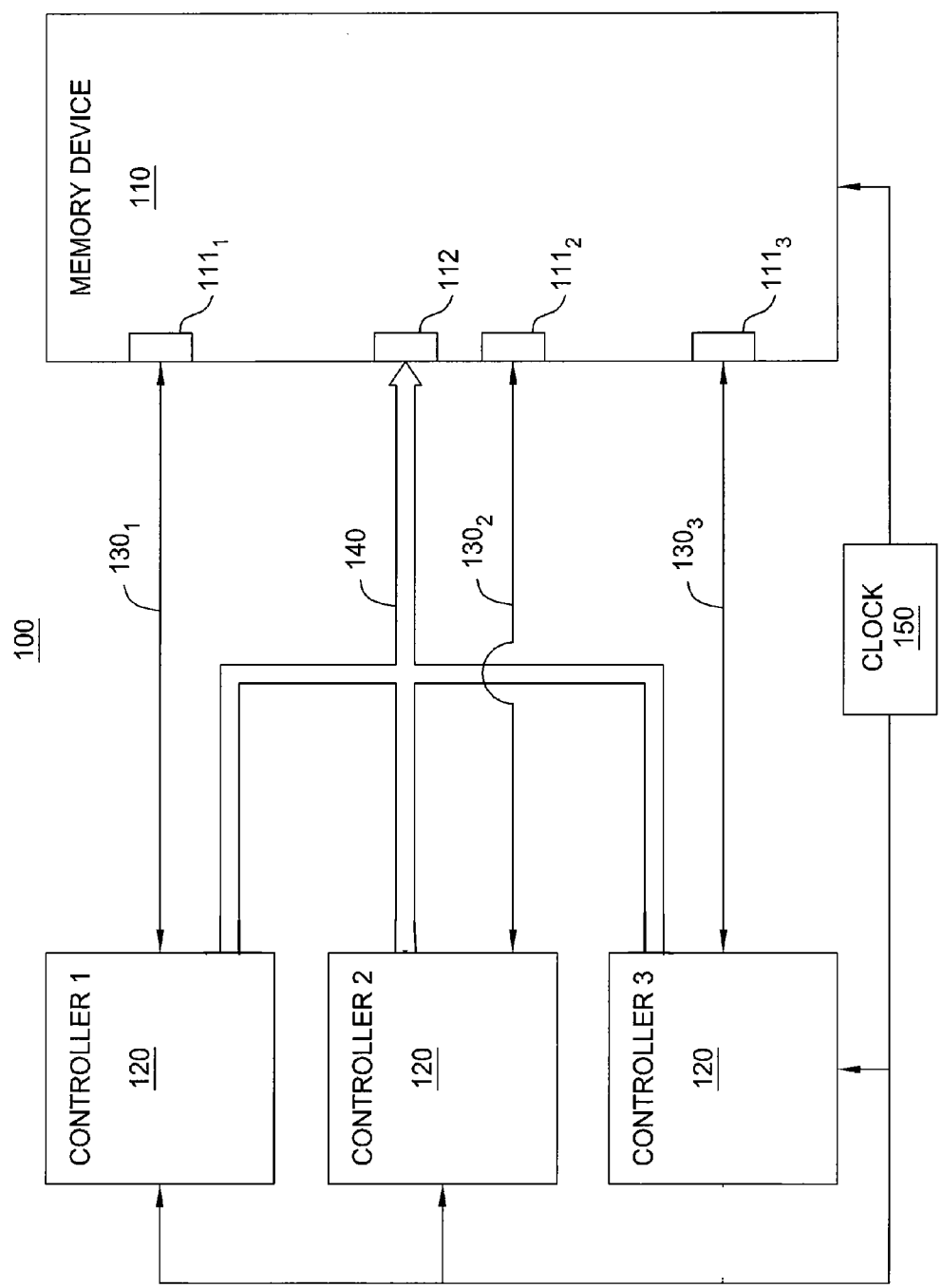
FIG. 1A illustrates a system according to an example embodiment of the invention.

Embodiments of the invention include a memory device that may be accessed by a plurality of controllers or processor cores via respective ports of the memory device. Each controller may be coupled to a respective port of the memory device via a data bus. Each port of the memory device may be associated with a predefined section of memory, thereby giving each controller access to a distinct section of memory without interference from other controllers. A common command/address bus may couple the plurality of controllers to the memory device. Each controller may assert an active signal on a memory access control bus to gain access to the command/address bus to initiate a memory access.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Also, signal names used below are exemplary names, indicative of signals used to perform various functions in a given memory device. In some cases, the relative signals may vary from device to device. Furthermore, the circuits and devices described below and depicted in the figures are merely exemplary of embodiments of the invention. As recognized by those of ordinary skill in the art, embodiments of the invention may be utilized with any memory device.

Embodiments of the invention may generally be used with any type of memory. In one embodiment, the memory may be a circuit included on a device with other types of circuits. For example, the memory may be integrated into a processor device, memory controller device, or other type of integrated circuit device. Devices into which the memory is integrated may include system-on-a-chip (SOC) devices. In another embodiment, the memory may be provided as a memory device which is used with a separate memory controller device or processor device.

In both situations, where the memory is integrated into a device with other circuits and where the memory is provided as a separate device, the memory may be used as part of a larger computer system. The computer system may include a motherboard, central processor, memory controller, the memory, a hard drive, graphics processor, peripherals, and any other devices which may be found in a computer system. The computer system may be part of a personal computer, a server computer, or a smaller system such as an embedded system, personal digital assistant (PDA), or mobile phone.

In some cases, a device including the memory may be packaged together with other devices. Such packages may include any other types of devices, including other devices with the same type of memory, other devices with different types of memory, and/or other devices including processors and/or memory controllers. Also, in some cases, the memory may be included in a device mounted on a memory module. The memory module may include other devices including memories, a buffer chip device, and/or a controller chip device. The memory module may also be included in a larger system such as the systems described above.

In some cases, embodiments of the invention may be used with multiple types of memory or with a memory which is included on a device with multiple other types of memory. The memory types may include volatile memory and non-volatile memory. Volatile memories may include static random access memory (SRAM), pseudo-static random access memory (PSRAM), and dynamic random access memory (DRAM). DRAM types may include single data rate (SDR) DRAM, double data rate (DDR) DRAM, low power (LP) DDR DRAM, and any other types of DRAM. Nonvolatile memory types may include magnetic RAM (MRAM), flash memory, resistive RAM (RRAM), ferroelectric RAM (FeRAM), phase-change RAM (PCRAM), electrically erasable programmable read-only memory (EEPROM), laser programmable fuses, electrically programmable fuses (e-fuses), and any other types of nonvolatile memory.

Computer systems may include a plurality of processors configured to do a respective task. For example, in a mobile device such as, for example, a cell phone, a plurality of processors may be associated with a respective feature of the mobile device. For example, a first processor may facilitate text messaging, a second processor may handle phone calls, a third processor may facilitate video and/or audio playback, and so on.

Each processor may require memory to store and modify data. For example, a processor that facilitates audio playback may require memory to store music files. In some cases, a separate memory device may be provided for each processor, thereby allowing each processor to store, access, and modify data in its respective memory device. While this arrangement provides flexibility to each of the processors in accessing memory for desired data, maintaining multiple memory devices may lead to increased power consumption. Furthermore, the multiple memory devices may occupy a lot of physical space, which may limit the ability to make small mobile devices with many features.

Moreover, modern memory devices are made with great memory densities, thereby allowing a large amount of storage space to be packed into a single memory device. Providing memory devices with such large amounts of memory to each processor of a mobile device may be inefficient because, individually, the processors may not require a large amount of memory space to enable a particular feature.

According to an example embodiment of the invention, a memory device is provided that may be accessed by a plurality of controllers via respective ports of the memory device. FIG. 1A illustrates an exemplary system 100 comprising a memory device 110, a plurality of controllers 120, and a system clock 150, according to an embodiment of the invention. In one embodiment, the controllers 120 may be memory controllers. Each of the controllers 120 may each be associated with a respective processor (not shown). In one embodiment, the controllers 120 may be a part of a single processing unit comprising a plurality of processor cores, wherein each controller 120 is associated with one or more of the processor cores. Alternatively, in some embodiments, each controller 120 may be a part of a separate processing unit comprising one or more processing cores. While the controllers 120 are shown as being integrated into a processing unit comprising one or more processor cores, in some embodiments, the controllers 120 may be separate and distinct processing units configured to communicate with one or more processing cores via one or more busses.

The controllers 120 may be configured to manage the flow of data to and from memory 110. For example, each controller 120 may be configured to receive data read and/or data write commands from a processor core (not shown). In response to receiving the requests, the controller 120 may be configured to perform a read access, write access, or the like, to the memory 110. While three controllers 1, 2, and 3, are illustrated in FIG. 1A, it is contemplated that any number of controllers 120 may be included in the system 100.

Figure 1B:
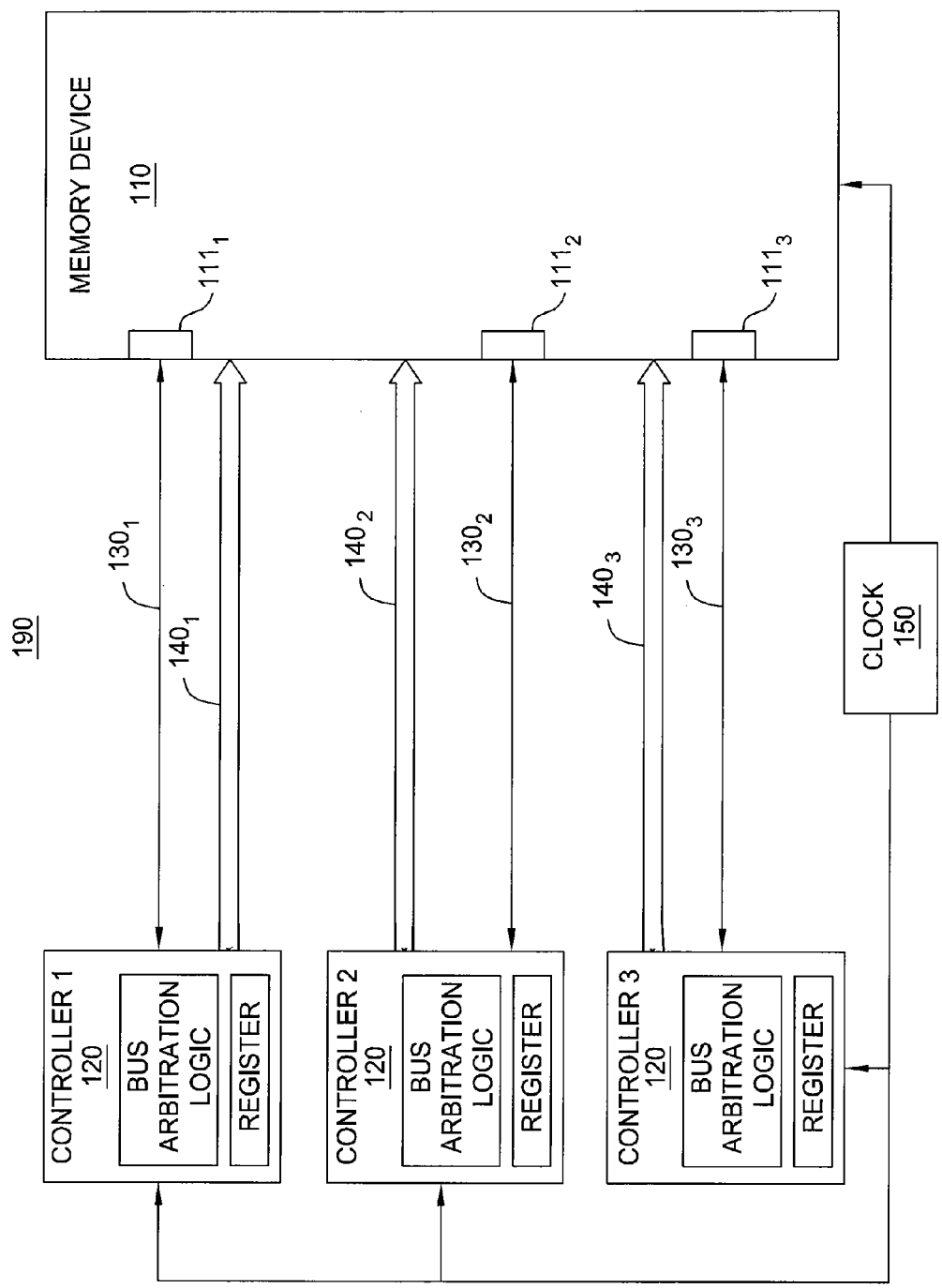
FIG. 1B illustrates another system according to an example embodiment of the invention.

As illustrated in FIG. 1B, each controller 120 of FIG. 1A may include bus arbitration logic 121. Bus arbitration logic 121 may be configured to control transfer of signals on one or more buses coupled with each controller 120, as is described in greater detail below. Each controller 120 may also include a register 122 for storing, for example, priority data regarding the controllers 120. The significance of the priority data is described in greater detail below.

Data may be exchanged between the controllers 120 and the memory device 110 via a data bus. In one embodiment, each controller 120 may have its own separate data bus coupling the controller 120 to a respective port of the memory device 110. For example, data buses $130_1$, $130_2$ and $130_3$ couple each of the controllers 1, 2, and 3 to ports $111_1$, $111_2$, $111_3$, respectively, of memory device 110. Each of the data buses $130_1$-$130_3$ may include a plurality of conductive lines to transfer a plurality of data bits to and from the memory device 110 at a time.

In one embodiment of the invention, the data buses 130 may be single ended busses. In other words, each data bus 130 may include a plurality of conductive lines, wherein each conductive line transfers a bit value. The value of the bit transferred on a conductive line of a single ended bus may be determined by, for example, comparing a voltage or current on the conductive line to a reference voltage or current.

In an alternative embodiment, the data buses 130 may be differential busses. In other words, each data bus 130 may include a pair of conductive lines wherein each pair of conductive lines transfers a respective bit value. The value of the bit transferred on a pair of conductive lines of a differential data bus may be determined by comparing voltage and/or current values transferred on each conductive line of the pair.

In a particular embodiment of the invention, each data bus 130 may be 4 bits wide, single ended, and configured to support data transfers at up to 5 gigabytes per second (Gb/s) per conductive line of the data bus. Furthermore, the data busses 130 may be configured to transfer data at any one of single data rate (SDR), double data rate (DDR), quadruple data rate (QDR), DDR2, DDR3, DDR4, and the like. In one embodiment of the invention, the memory device 110 may support a burst mode. The burst mode allows the memory device 110 to output bits of a plurality of columns at different addresses for a given request (i.e., without requiring separate read commands with respective column addresses). The burst length may be specified in a programmable register of the memory device 110. For example, in a particular embodiment the memory device 110 may be configured to transfer data on to the data busses 130 with a burst length of 32 bits. In this case, during each memory access, the memory device 110 may be configured to transfer 32 bits of data on each conductive line of a data bus 130. In alternative embodiments, any other appropriate burst length (for example, 64 bits) may also be used.

Address and command signals may be transferred between the controllers 120 and the memory device 110 via a command/address (CA) bus. In one embodiment of the invention a common CA bus may couple the plurality of controllers 120 to the memory device 110. For example, as illustrated in FIG. 1A, the plurality of controllers 120 are shown coupled with a port 112 of the memory device 110 via a common CA bus 140. The CA bus 140 may include a plurality of conductive lines for transferring command and address signals from the controllers 120 to the memory device 110. Command signals may include signals such as, for example, write enable, read enable, clock enable, column address strobe (CAS), row address strobe (RAS), and the like. Address signals may indicate a location in a memory array of the memory device 110 from where data is to be retrieved or stored.

In some embodiments it may be desirable to avoid conflict between the controllers 120 while accessing the CA bus 140. Accordingly, in an alternative embodiment a plurality of CA buses 140 may be included in the system, wherein each CA bus 140 couples a controller 120 with the memory device 110. FIG. 1B illustrates an exemplary system 190 wherein a plurality of CA busses 1401-1403 couple controllers 1201-1203 to the memory device 110. System 190 may be similar to system 100 except that separate CA busses 140 are illustrated rather than a common CA bus 140. Accordingly, each controller 120 may be configured to assert address and command signals on its own respective CA bus 140 while accessing the memory device 110.

In a particular embodiment of the invention, the CA bus 140 may be single ended, may include 13 conductive lines, and may be configured to transfer data at 2.5 Gb/s at a double data rate (DDR). Alternatively, the CA bus 140 may be configured to transfer data at a single data rate (SDR), in which case the number of conductive lines of the CA bus 140 may be doubled to maintain the same data transfer rate as DDR. In alternative embodiments, the CA bus may also be configured to support data transfers using DDR2 technology, DDR3 technology, and other future synchronous memory specifications. In one embodiment of the invention, commands and addresses may be transferred at different data rates on the CA bus 140. For example, in a particular embodiment, commands may be transferred on the CA bus at a single data rate (SDR), while addresses may be transferred at a double data rate (DDR).

In a particular embodiment comprising four controllers 120 coupled with a memory device 110 via a common CA bus 140 and four respective data buses 130, data may be transferred on the common CA bus 140 using a clock frequency that is half the clock frequency used for transferring data on the data buses 130. Furthermore, the data buses 130 may transfer data at a double data rate (DDR) with a burst length of 32 bits. In this particular embodiment, command and address bits may be transferred to the memory device 110 at a double data rate over two bit transfers, thereby allowing eight commands to be transferred during a single data burst. Therefore, the minimum requirement for the command bandwidth of a memory device, which is two commands per read/write access, is met.

The clock 150 may be configured to generate one or more clock signals that are received by the controllers 120 and/or the memory device 110, as illustrated in FIGS. 1A and 1B. The clock signal (or signals) may be used to synchronously transfer data, command signals, address signals, and the like over the data busses 130 and the CA bus 140. While a single clock 150 is shown providing a clock signal to the controllers 120 and the memory device 110, other alternative means for providing the clock signal to the system components is also contemplated. For example, in one embodiment, a first controller 120 may receive one or more clock signals from the clock 150. The first controller 120 may then generate a clock signal based on the received clock signal and transmit the generated clock signal to one or more other controllers 120 and/or the memory device 110. In other embodiments, a plurality of clocks 150 may be provided, wherein each clock provides one or more clock signals to one or more system devices.

In one embodiment of the invention, each controller 120 may be configured to operate at a different frequency. For example, a first controller may operate at a first frequency and a second controller may operate at a second frequency. Both of the first controller and the second controller may be configured to access the memory device while operating at their respective frequency. In other words, the memory device 110 may be configured to adjust its own respective frequency based on the particular controller that is accessing the memory device. Accordingly, the memory device may include a phase locked loop (PLL), delay locked loop (DLL), frequency divider, and the like, that may be used to generate clock signals with different frequencies, in some embodiments.

One advantage of including a shared (or common) CA bus 140 is that the pin count of the DRAM may be greatly reduced. For example, if each controller 120 had a separate CA bus coupling the controller 120 to the memory device 110, a plurality of ports 112 (one for each controller) would have to be included in the memory device 110. This may be undesirable in some cases because the plurality of ports would each have to include a plurality of command and address pins for receiving the commands and address signals from each of the controllers 120.

Figure 2:
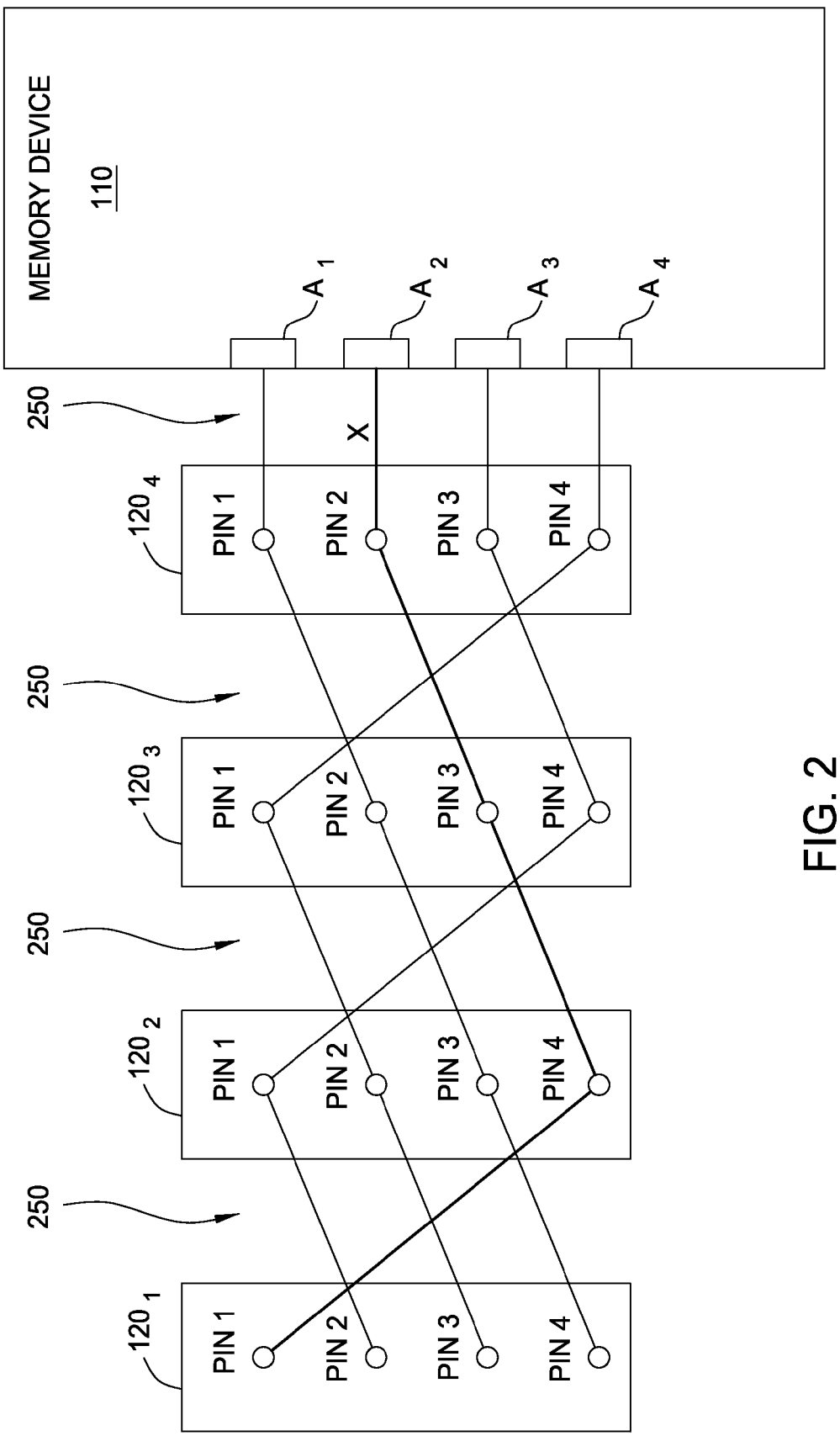
FIG. 2 illustrates memory access control bus coupling a plurality of controllers and a memory device, according to an embodiment of the invention.

If the CA bus 140 is shared between the controllers 120, only one controller 120 may be allowed to drive the bus 140 at any given time. In one embodiment of the invention, each controller 120 may be configured to assert an active signal which indicates to the other controllers 120 that an access of the CA bus 140 is about to begin. FIG. 2 illustrates a memory access control bus 250 that couples the controllers 120 to each other and the memory device 110. In one embodiment, the memory access control bus 250 may include a plurality of conductive lines corresponding to the number of controllers 120. For example, because four controllers 120 are illustrated in FIG. 2, the memory control access bus 250 is shown with four conductive lines.

As illustrated in FIG. 2, the conductive lines of memory control access bus 250 may couple pins 1-4 for of each of the controllers 120. For example, a conductive line X of the memory control access bus 250 couples pin1 of controller $120_1$ to pins 4, 3, and 2 respectively of controllers $120_2$, $120_3$, and $120_4$, as illustrated in FIG. 2. In one embodiment of the invention, pin 1 of each controller 120 may be configured to assert the active signal indicating that the respective controller 120 is about to access the CA bus 140.

Pins 2-4 of each controller 120 may be configured to receive active signals from other controllers 120. In one embodiment of the invention, each controller 120 may be configured to monitor its respective pins 2-4 to determine whether the CA bus is busy, i.e., whether the CA bus is being used by another controller 120. If the CA bus 140 is not busy, and a controller 120 desires access to the CA bus 140, the controller may assert its active signal, for example, by driving a signal on its pin 1. The signal may be received by each of the other controllers on one of their respective pins 2-4. In a clock cycle following the clock cycle in which the active signal is asserted the controller 120 may access the CA bus 140, for example, by driving command and/or address signals thereon.

In some cases it may be possible that two controllers 120 determine that the CA bus is available, and therefore assert their active signals at or near the same time. In such cases of conflict, a priority scheme may be used to determine which controller 120 gets to access the CA bus 140 first. For example, referring to FIG. 1B, the bus arbitration logic 121 in controllers 1201 and 1202 may determine that the CA bus 140 is available. Accordingly, the controllers 1201 and 1202 may assert an active signal at the same time at their respective pins 1. The active signal asserted by controller 1201 may be received by controller 1202 at its pin 4, as illustrated in FIG. 2. The active signal asserted by controller 1202 may be received by controller 1201 at its pin 2, as illustrated in FIG. 2. Therefore, the controllers 1201 and 1202 may detect a conflict.

To resolve conflicts, each controller 120 may include data indicating relative priority between the controllers 120 of the system. For example, in one embodiment, priority data may be stored in a register of the controller 120, thereby facilitating conflict resolution. For example, in the above described scenario, if controller $120_1$ has a greater priority than controller $120_2$, then controller $120_1$ may access the CA bus 140 in the subsequent clock cycle, and controller $120_2$ may deactivate its asserted active signal and wait until the CA bus 140 is next available to initiate an access to the CA bus as described above. The operations performed to resolve conflicts as described above may be performed by the bus arbitration logic 121 of each controller.

Memory control access bus 250 may also couple the controllers 120 to the memory device 110, as illustrated in FIG. 2. Therefore, the memory device 110 may also receive the active signals generated by the controllers 120. For example, in the exemplary arrangement of FIG. 2, the active signal generated at pin 1 of controller $120_1$ is received at port A2 of the memory device 110, the active signal generated at pin 1 of controller $120_2$ is received at port A3 of the memory device 110, the active signal generated at pin 1 of controller $120_3$ is received at port A4, and the active signal generated at pin 1 of controller $120_4$ is received at port A1 of the memory device 110. In one embodiment of the invention, the active signals asserted on the memory control access bus 250 may serve as a chip select signal for the memory device 110. In other words, when any one of the controllers 120 asserts an active signal on a respective line of the memory access control bus 250, the memory device 110 may be selected by the controller 120 asserting the active signal (once any bus contention conflicts are resolved).

In some embodiments, it may be possible that two or more controllers 120 assert their active signals at the same time. The two or more active signals generated by the two or more controllers 120 may be received by the memory device 110. As discussed above the active signals received by the memory device 110 may operate to select the memory device. For example, a chip select signal may be generated by performing an OR operation on signals received via the ports A1-A4. However, in some embodiments, the memory device 110 may not be accessed by two or more controllers 120 at the same time. Therefore, even though two or more controllers 120 may assert an active signal at the same time in a first clock cycle, command and address signals for accessing the memory device 110 may be received by the memory device 110 only after the highest priority controller 120 is determined, for example, in the next clock cycle.

Figure 3:
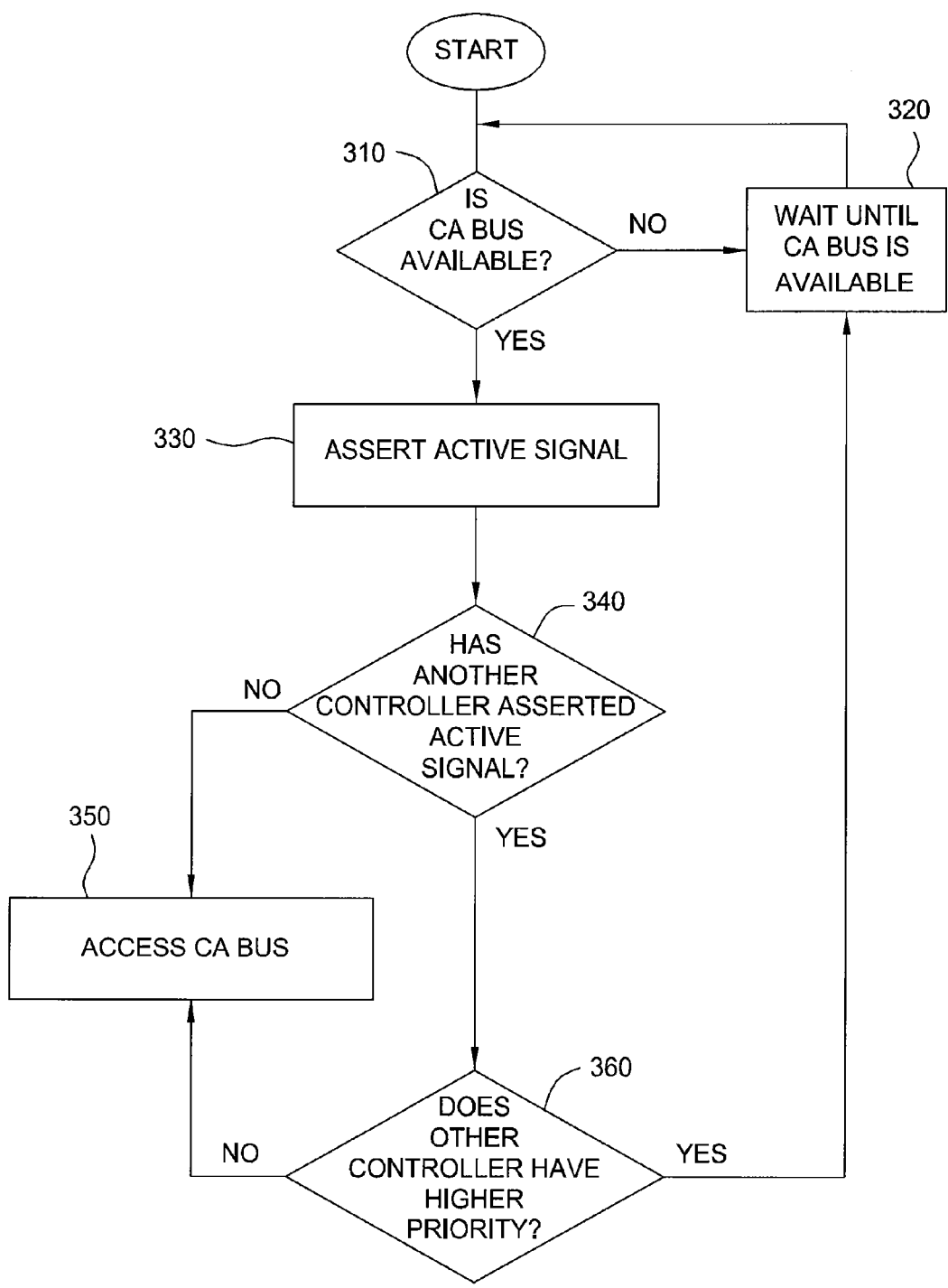
FIG. 3 is a flow diagram of exemplary operations performed by a controller to access a memory device, according to an embodiment of the invention.

FIG. 3 is a flow diagram of exemplary operations performed by bus arbitration logic 121 of a controller 120 to access the CA bus 140. For purposes of illustration the steps of the flow diagram are assumed to be performed by bus arbitration logic 121 of controller 1201 of FIG. 1B. The operations may begin in step 310 by determining whether the CA bus 140 is available. For example, controller 1201 may determine whether an active signal asserted by another system controller 120 is detected on its respective pins 2-4 (FIG. 2). If an active signal from another controller 120 is detected, in step 320, controller 1201 may wait until the CA bus becomes available. For example, the controller 1201 may wait until the active signal received on one of its respective pins 2-4 is deactivated.

If, in step 310 it is determined that the CA bus 140 is available, then in step 330, the controller 1201 may assert an active signal on a conductive line of the memory access control bus 250. For example, controller 1201 may assert an active signal on pin 1 to notify other controllers that controller 1201 is about to access the CA bus 140. In the exemplary arrangement illustrated in FIG. 2, the active signal asserted by controller 1201 at pin 1 is received by controller 1202 at pin 4, by controller 1203 at pin 3, and by controller 1204 at pin 2, as illustrated.

In step 340, the controller 1201 may determine whether another controller 120 has asserted an active signal at or near the same time as controller 1201. For example, if controller 1201 detects an active signal asserted by another controller 120 at pins 2-4 after controller 1201 has asserted the active signal, then a conflict may exist. If a conflict is not detected in step 340, then in step 350, the controller 1201 may access the CA bus 140. On the other hand, if a conflict does exist, in step 360, the controller 1201 may determine whether the other controller (or controllers) 120 asserting the active signal has (have) a higher priority. Determining whether the other controller has a higher priority may involve, for example, accessing a register, for example a register 122 (FIG. 1B) in each controller 120 comprising priority data for the system controllers.

If it is determined that controller $120_1$ has the higher priority, then in step 350, controller $120_1$ may access the CA bus 140. On the other hand, if it is determined that controller $120_1$ has a lower priority, then in step 320, controller $120_1$ may wait until the CA bus becomes available after access by the other controller (or controllers) 120, as illustrated in FIG. 3.

In one embodiment of the invention, a controller having a lower priority may wait until a memory access is completed by the higher priority controller. After the memory access by the higher priority controller is finished the higher priority controller may deassert its respective active signal. After the active signal of the higher priority controller has been deasserted, the lower priority controller may again assert its respective active signal, at which time, the bus arbitration logic 121 (FIG. 1B) of the lower priority controller may again perform the steps outlined in FIG. 3.

In one embodiment of the invention, the memory access control bus 250 may not be included. Therefore, the memory device 110 may not include memory access control ports such as the ports A1-A4 illustrated in FIG. 2. In such embodiments, the memory device 110 may be configured to determine the data port for transferring data based on an address received via the CA bus 140. For example, each controller 120 may be associated with a given data port 111 (FIGS. 1A and 1B) and a predefined section of the memory device 110. If an address that falls within the predefined memory section associated with a given controller 120 is received, then data may be exchanged with the given controller via the respective data port. By avoiding the memory access control bus 250, the pin count of the memory device 110 may be reduced.

Figure 4:
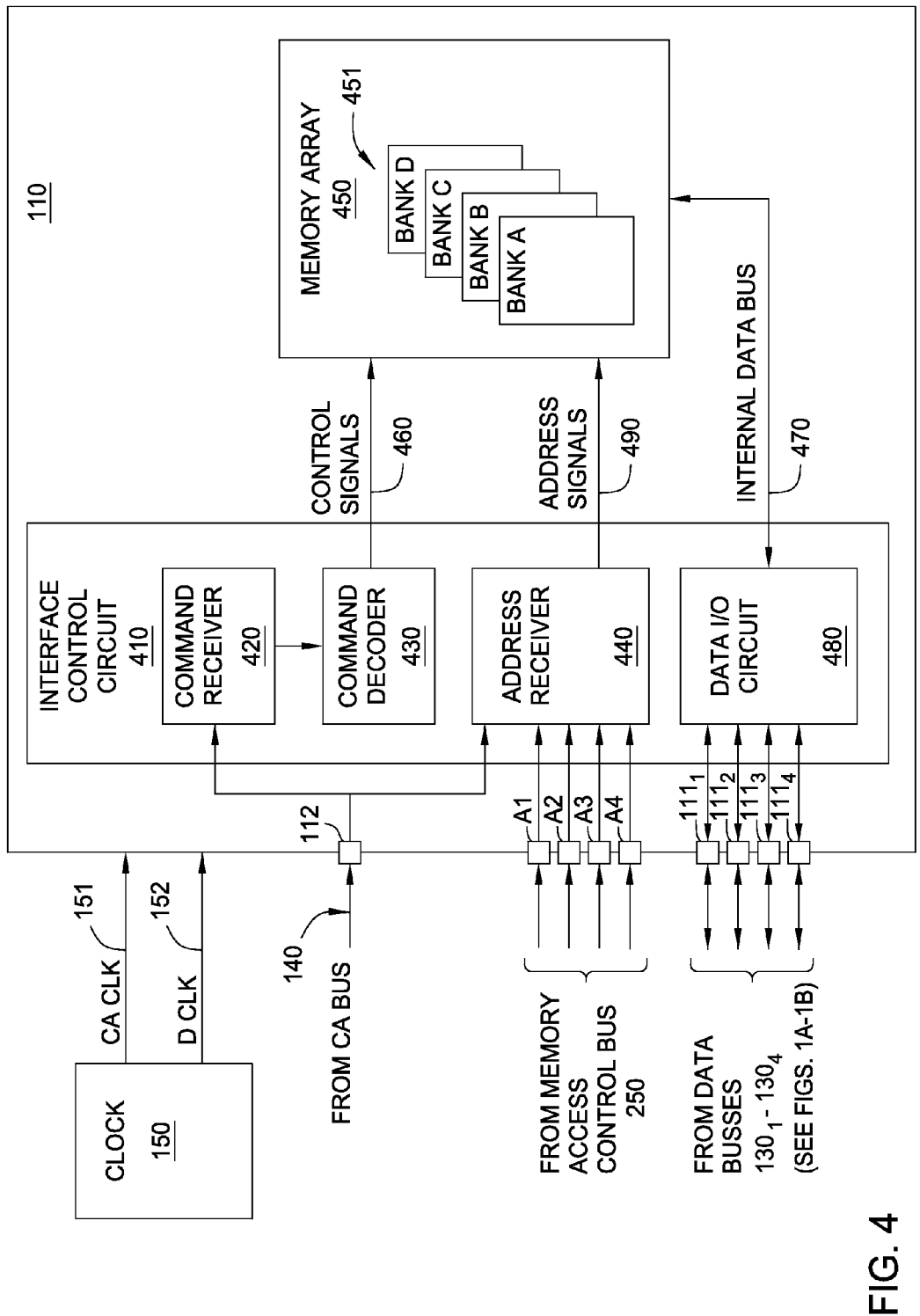
FIG. 4 illustrates an exemplary memory device according to an embodiment of the invention.

FIG. 4 illustrates a more detailed view of a memory device 110, according to an embodiment of the invention. As illustrated in FIG. 4, memory device 110 may include interface control circuitry 410 and a memory array 450. The interface control circuit 410 may include a command receiver 420, command decoder 430, an address receiver 440, and a data input output (I/O) circuit 480. While the command receiver 420, command decoder 430, the address receiver 440, and the data input output (I/O) circuit 480 are all shown as a part of the interface control circuitry 410, in some embodiments, any one of these elements may be a distinct circuit separate from the interface control circuitry 410.

In general, the interface control circuit 410 may be configured to receive and process the signals received from the controllers 120. For example, command receiver 420 may be configured to receive command signals from one or more conductive lines of the CA bus 140 via the port 112, as illustrated in FIG. 4. Commands received by the command receiver 420 may be provided to the command decoder 430. Command decoder 430 may decode the command to determine what type of command has been received. For example, command decoder 430 may determine whether a received command is a write command, read command, or the like.

In one embodiment of the invention, the command decoder 430 may generate one or more control signals 460 in response to decoding a command, thereby resulting in a memory access to the memory array 450. For example, if the received command is an activate command, the command decoder 430 may assert the appropriate control signals 460 to open the addressed row in a memory array of the memory device 110 in preparation for a read/write operation. Thereafter, the command decoder may receive and decode an external read or write request for the open row. After the open row is accessed (i.e., the data is read from or written to the open row), the accessed row is closed. Of course, persons skilled in the art will recognize other possible internal command sequences.

Address receiver circuit 440 may be configured to receive one or more address signals from one or more conductive lines of the CA bus 140 via the port 112, as illustrated in FIG. 4. In one embodiment of the invention, the address receiver circuit 440 may also receive the active signals generated by the controllers 120 on the memory access control bus 250 via, for example, the ports A1-A4, as illustrated in FIG. 4. In one embodiment, a combination of address signals 490 received via the CA bus 140 and active signals received via the memory access control bus 250 determines a location in memory 110 that is to be accessed, as is described below.

Data I/O circuit 480 may be configured to receive data from and send data to the controllers 120 via the data busses 130 (See FIG. 1A which shows only three data buses) associated with the controllers 120. As illustrated in FIG. 4, the memory device 110 may include a plurality of data ports 111 which couple each controller 120 to the memory device 110 via the data lines 130. The data I/O circuit 480 may transfer data received from the controllers 120 via the data busses 130 to the memory array 450 via the internal data bus 470 that couples the data I/O circuit 480 to the memory array 450. The data lines 470 may also be used by the data I/O circuit 480 to retrieve data from the memory array 450. The retrieved data may be transferred to the controllers 120 via the busses 130.

In one embodiment of the invention, the data I/O circuit 480 may be configured to power down one or more of the data ports 111. While in a power down mode, the data ports 111 may be configured to consume relatively lesser power. For example, in response to determining that one or more of the controllers 120 are inactive, the data I/O circuit 480 may deactivate respective ports 111 to reduce power consumption at the data ports. In a particular embodiment, the controllers 120 may be configured to assert commands to power down or deactivate data ports associated therewith. The commands may be received by the command receiver and the command decoder, which may cause the data I/O circuit 480 to power down one or more data ports 111.

In one embodiment, the memory array 450 may include a plurality of banks 451. Each bank 451 may be a distinct (i.e., separately addressable) section of the memory array 450, each comprising a plurality of memory cells. For illustrative purposes, only four banks 451 (Banks A-D) are shown in FIG. 4. However, in alternative embodiments, any number of banks 451 may exist in the memory device 110. In some embodiments, the memory device 110 may include a plurality of memory arrays, wherein each memory array includes a plurality of memory banks.

FIG. 4 also illustrates clock signals CA Clk and D Clk received by the memory device 110 from a clock 150 via clock signal lines 151 and 152. The clock signals CA Clk and D Clk may be used by the memory device 110 to communicate with the controllers 120. For example, the CA Clk may be used by the command receiver 420 and the address receiver 440 to capture command signals received over the CA bus 140. The D Clk signal may be used by the data I/O circuit 480 to receive and transfer data bits over the data busses 130. In a particular embodiment of the invention, the CA Clk may operate at up to 1.25 qiqaHertz (GHz) and the D Clk may operate at up to 2.5 GHz. However, any appropriate clock frequency may be used in other embodiments.

In one embodiment of the invention, the clock signal lines 151 and 152 may be differential clock signal lines. Alternatively, a single ended clock signal line may also be implemented. In a particular embodiment, a separate clock signal line 152 may be provided for each data bus 130. In other embodiments, a signal line 152 may be associated with one or more data busses 130. For example, a first signal line 152 may be associated with data busses $130_1$ and $130_2$ while a second signal line 152 may be associated with data busses $130_3$ and $130_4$.

In one embodiment of the invention, each controller 120 may have a predefined portion of the memory array 450 that is accessed by the controller 120. In other words, the available memory in memory device 110 may be partitioned into a plurality of partitions, wherein each memory partition is provided to one of the controllers 120. By partitioning the memory device in such a manner, each controller 120 may have its own respective memory space to store data, without interference from other controllers. In one embodiment, each section may include a physically contiguous area of memory. However, in alternative embodiments, each section may be a logical partition comprising different physical areas of memory defined as a part of the same address space.

Figure 5:
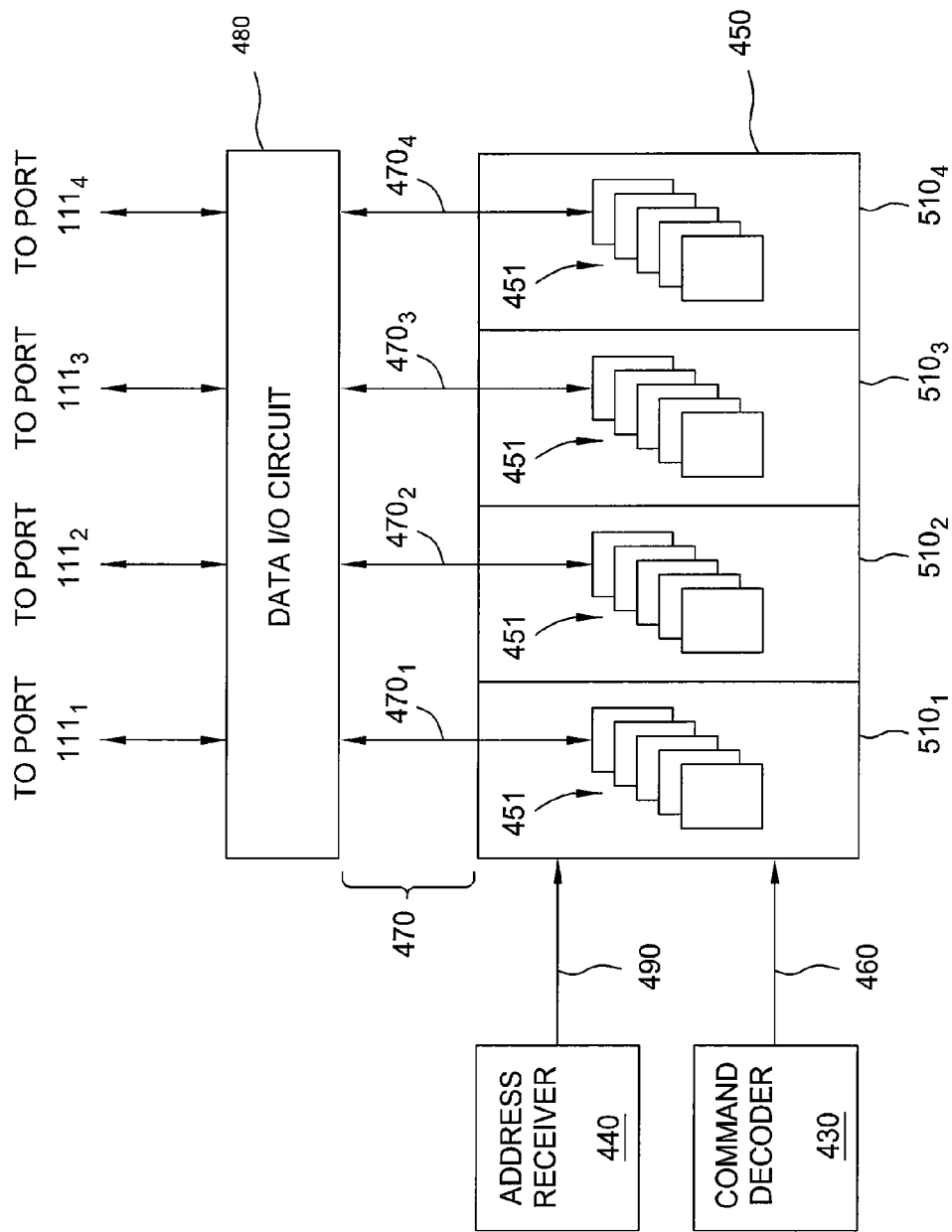
FIG. 5 illustrate an exemplary memory array according to an embodiment of the invention.

In one embodiment, the memory array 450 of memory device 110 may be divided into a plurality of sections, wherein each section comprises one or more banks 451. FIG. 5 illustrates a more detailed view of an exemplary memory array 450 according to an embodiment of the invention. As illustrated in FIG. 5, the memory array 450 may include a plurality of sections 510 (four sections 5101-5104 are shown). Each section 510 may include one or more of memory banks 451. In a particular embodiment, the memory array 450 may include any one of two, four and eight banks per section 510.

In one embodiment of the invention, each section 510 may be associated with a port 111 of the memory device 110. As illustrated in FIG. 5, an internal data bus 470 may couple the plurality of sections 510 of memory array 450 to the data I/O circuit 480. For example, a data bus $470_1$ may couple section $510_1$ to the data I/O circuit 480, a data bus $470_2$ may couple section $510_2$ to the data I/O circuit 480, a data bus $470_3$ may couple section $510_3$ to the data I/O circuit 480, and a data bus $470_4$ may couple section $510_4$ to the data I/O circuit 480.

The data I/O circuit 480 may be configured to exchange data between a data bus $470_1$-$470_4$ and a respective port $111_1$-$111_4$. In one embodiment of the invention, data received from each internal data bus $470_1$-$470_4$ may be transferred to a predefined port $111_1$-$111_4$, and vice versa. For example, data received from a data bus $470_1$ may always be transferred to port $111_1$. As another example, data received via port $111_3$ may be transferred to the data bus $470_3$. By associating each one of the sections 510 to a respective port 111, each controller 120 of the system may have dedicated memory that is accessible via a respective port 111.

In some embodiments of the invention, it may be possible to configure the number of data ports 111 of the memory device 110 that are being used to access the memory device 110. For example, it may be possible that the number of available ports 111 of the memory device 110 is greater than a number of controllers 120 in the system 100. As an example, in a system including only three controllers 120 (such as in FIGS. 1A and 1B), ports 1111-1113 may be coupled to each of the three system controllers 120, respectively. Port 1114 may be left unconnected because only three controllers 120 exist in the system, which may leave a section, for example, the section 5104, inaccessible and unused.

In one embodiment, more than one section of the memory device 110 may be assigned to the same data port 111. Therefore, each of the data ports may be able to access different amounts of memory of the memory device 110, in one embodiment. For example, in the above example, to utilize all the available memory, data I/O circuit 480 may be configured to transfer data received on data bus $470_4$ to any one of the ports $111_1$-$111_3$. Therefore, it may be possible to associate more than one of the internal data busses $470_1$-$470_4$ with one of the ports 111. This may be accomplished by providing, for example, a register (not shown) in the memory device 110 defining the associations between the internal data busses $470_1$-$470_4$ to the ports 111. Data I/O circuit 480 may be configured to access the register to determine the routing of data between the ports 111 and the internal data busses $470_1$-$470_4$. The associations between the internal data busses and the ports may be defined in the register during manufacture of the system, and updated as controllers 120 are added or removed from the system. Data I/O circuit may access the register, for example, during system power up to determine associations between the internal data busses and the data ports.

In one embodiment of the invention, the address signals sent via internal address lines 490 by the address receiver 440 may determine which particular section 510 of the memory array 450 is accessed during a memory operation. As discussed above, the address signals may include a combination of the active signals received from the controllers 120 via the memory access control bus 250 and address signals received from the controllers 120 via the CA bus 140. In one embodiment of the invention, the active signals generated by the controllers 120 may be translated into a section address to select the section of the memory array 450 that is associated with the controller 120 that provided the address signals on the CA bus 140. The signals on the CA bus 140 may then be decoded to determine the row and column addresses for the selected section of the memory array 450. For example, each bank 451 may include a row decoder and a column decoder associated therewith. The row decoder may receive one or more address signals from the address receiver and open one or more rows of the memory bank 451. The column decoder may receive another set of address signals from the address receiver and activate one or more bit lines in the memory bank.

FIG. 6 illustrates an exemplary truth table 600 for translating the active signals generated by the controllers 120 to a section address. For illustrative purposes the table assumes that 4 controllers assert active signals, which are denoted by a logic 1, and that four sections 510 exist in the memory array 450. As illustrated in Table 600, the columns 610 illustrate exemplary active signals received at the ports A1-A4 (See FIGS. 2 and 4). The active signals received at ports A1-A4 may be translated into a section address 620 comprising bits TA1 and TA2, for example. The combination of the bits TA1 and TA2 may determine the particular section that is accessed. For example, if a 0 is received on ports A1-A3, i.e., no active signal received on the ports, and if a 1 is received on port A4, then the TA1 and TA2 values may both be 0, indicating the section 5101 is being accessed.

In one embodiment of the invention, as described above with respect to FIG. 5, each section may include a plurality of banks 451. Accordingly, the section address may determine the particular bank group in which memory is to be accessed. In an alternative embodiment, the section address determined by, for example, the translated address bits TA1 and TA2, may correspond to a bank address. For example, if the memory array 450 includes four banks 451 (each bank being associated with a respective controller 120), the section address bits TA1 and TA2 may determine the particular bank that is being accessed.

Figure 7:
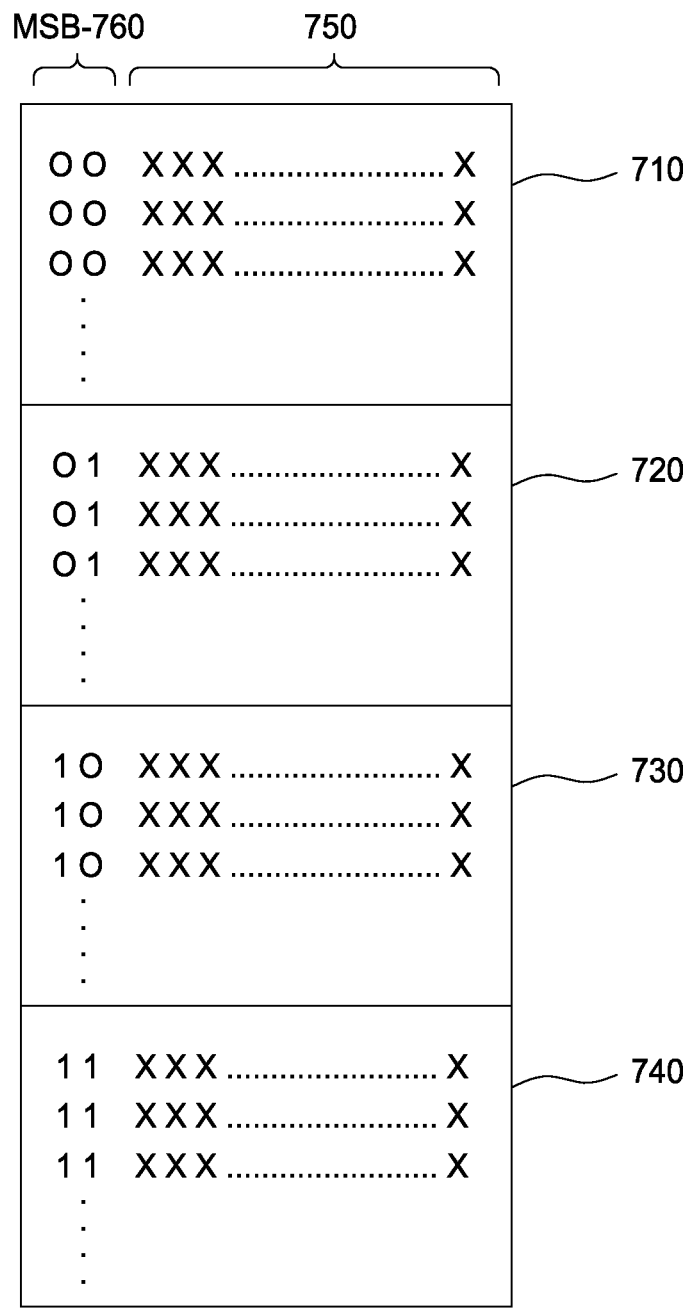
FIG. 7 illustrates address ranges of a memory array according to an example embodiment of the invention.

In some embodiments, the sections of memory array 450 may be defined by the row address. In a particular embodiment, the most significant bits of the row address may determine the section of the memory array 450. Accordingly, the section address bits derived from the active signals may correspond to the most significant bits of a row address. FIG. 7 illustrates a plurality of ranges of row addresses of a memory array determined by the most significant bits 760 of the row address. Specifically, FIG. 7 illustrates four ranges of row addresses 710-740. The most significant bits of address range 710 are '00', the most significant bits of address range 720 are '01', the most significant bits of address range 730 are '10', and the most significant bits of address range 740 are '11', as illustrated in FIG. 7.

In one embodiment of the invention, the most significant bits 760 may be derived by translating the active signals received via the memory control access bus 250, as described with respect to FIG. 6. The remaining address bits 750 may be derived from, for example, the CA bus 140. While two most significant bits are shown defining the sections of a memory array in FIG. 7, in alternative embodiments, any number of most significant bits, least significant bits, and the like, may be used to define memory sections in the memory array.

Figure 8:
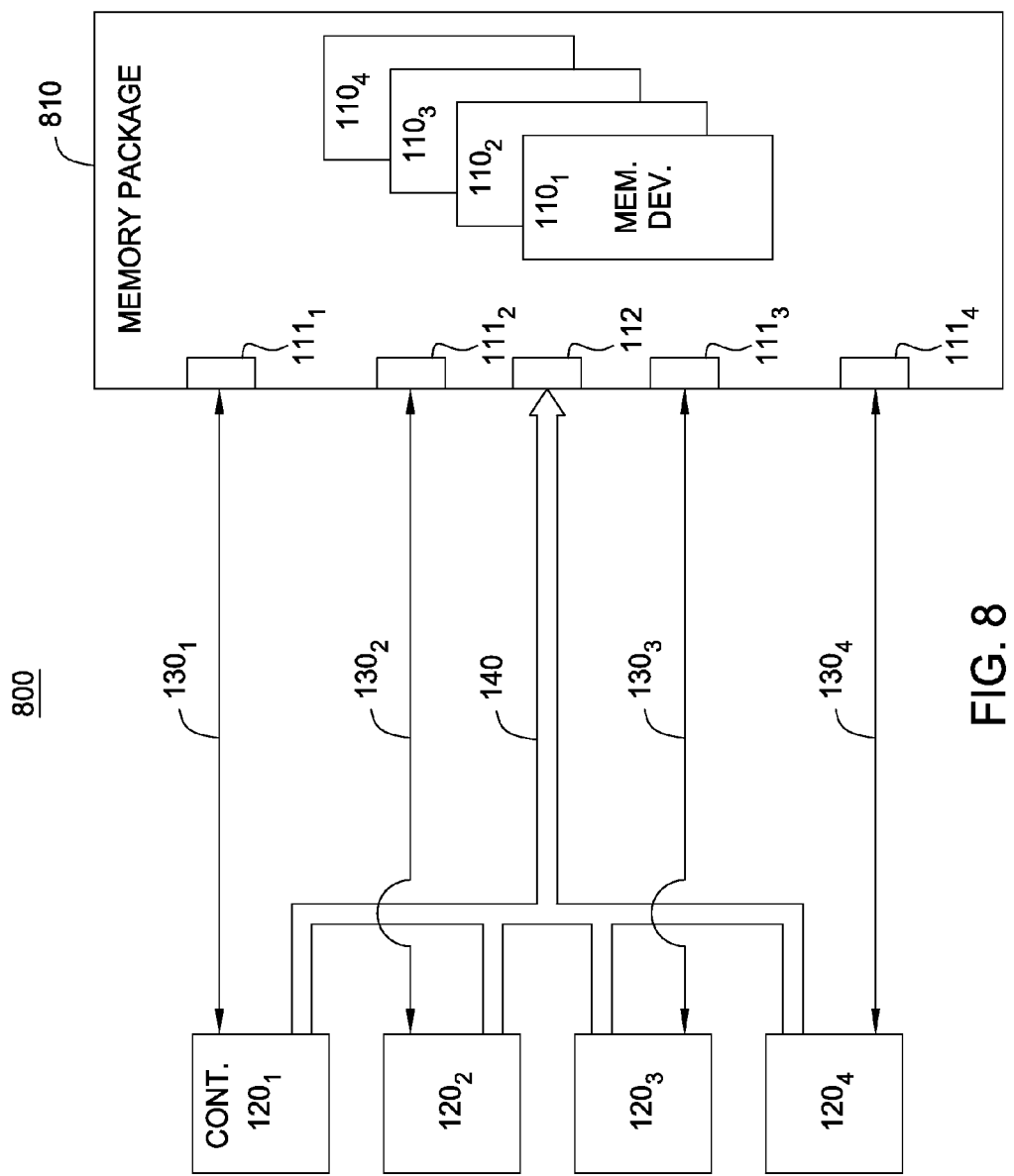
FIG. 8 illustrates another exemplary system according to an embodiment of the invention.

FIG. 8 illustrates another system 800 according to an embodiment of the invention. As illustrated in FIG. 8, the system 800 may include a memory package 810 coupled with a plurality of controllers 120 via a common CA bus 140. As illustrated in FIG. 8, the memory package 810 may include a plurality of memory devices 110. For example, four memory devices $110_1$-$110_4$ are illustrated in FIG. 8. In one embodiment of the invention, the memory devices 110 may be arranged in the memory package 810 in a stacked die configuration.

Memory package 810 may include a plurality of ports. For example, the ports $111_1$-$111_4$ are configured to receive data signals via data busses $130_1$-$130_4$ from controllers $120_1$-$120_4$, respectively. Furthermore, the memory package 810 may include a CA port 112 for receiving command and address signals from the controllers 120 via the common CA bus 140. In one embodiment, the command and address signals received via the CA port 112 in FIG. 8 may be routed to each one of the memory devices 110 in the package 810.

In one embodiment, a memory access control bus (not shown) may couple the controllers 120 of FIG. 8 with the memory package 810. The controllers 120 may assert active signals on the memory access control bus to arbitrate access to the common CA bus 140. In one embodiment of the invention, the active signals on the memory access control bus received by the memory package 810 may indicate which one of the memory devices $110_1$-$110_4$ is being accessed.

In one embodiment, each controller 120 may be configured to access a respective memory device 110 in the memory package 810 via its respective data bus 130. Therefore, the data signals asserted by a given controller may be transferred to a predefined memory device 110 in the package 810. For example, data signals transferred on data bus 1301 may be routed to the memory device 1101, data signals transferred on data bus 1302 may be routed to the memory device 1102, and so on.

The memory devices 110 in FIG. 8 may be similar to the memory device 110 illustrated in FIG. 4, except that data to and from each of the memory devices 110 of FIG. 8 are always transferred to a predetermined data bus 130 coupled with the package 810. In an alternative embodiment, the data signals to and from each memory device 110 of FIG. 8 may be selectably transferred to one or more of the data busses 130 coupled to the package 810.

Figure 9:
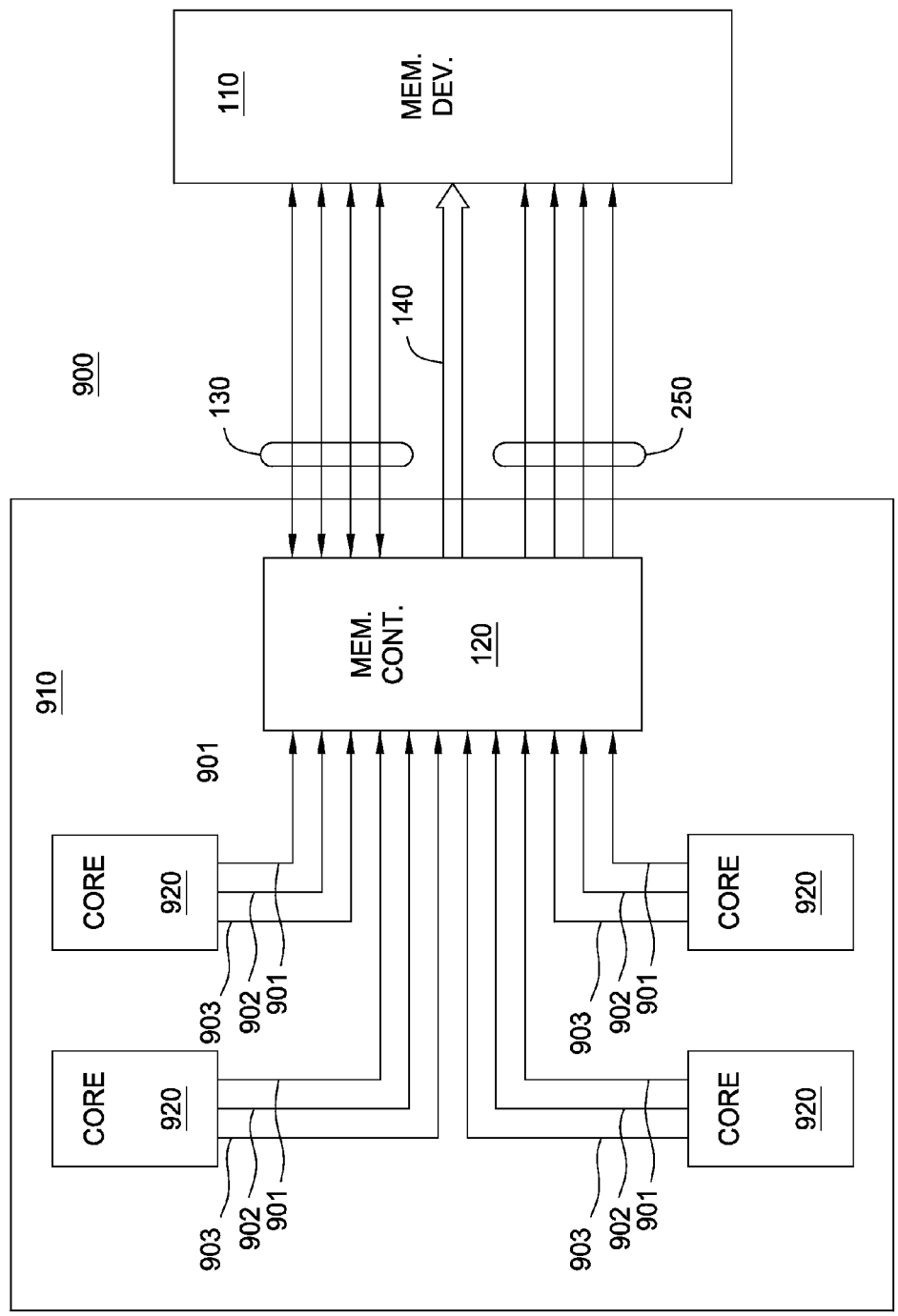
FIG. 9 illustrates yet another exemplary system according to an embodiment of the invention.

FIG. 9 illustrates yet another system 900, according to another embodiment of the invention. The system 900 may include a processor 910 and a memory device 110, as illustrated in FIG. 9. The memory device 110 may be similar to the memory device 110 illustrated in FIG. 4. Processor 910 may include a plurality of processor cores 920 and a memory controller 120. The processor cores 920 may be coupled to the memory controller 120 via a plurality of busses. For example, each processor core 920 may be coupled to the memory controller 120 via a data bus 901, a CA bus 902, and a memory access control line 903. The data bus 901 may carry data signals from the processor cores 920 to the memory controller 120. The CA bus 902 may carry command and address signals from the processor cores 920 to the memory controller 120. In one embodiment, the processor cores 920 may be configured to generate an active signal to access the memory device 110. Accordingly, in one embodiment, the processor cores 920 may be configured to assert an active signal on a memory access control line 903 to initiate an access to the memory device 110.

Memory controller 120 may receive the data, command, address, and active signals from the processor cores 920 and generate one or more signals on a plurality of data busses coupling the memory controller 120 to the memory device 110. The plurality of data busses may include data busses 130, a CA bus 140, and a memory control access bus 250, as illustrated in FIG. 9. In one embodiment, each processor core 920 may have a priority associated therewith, which may be stored, for example, in a register associated with the memory controller 120. If a conflict arises between two processor cores while attempting to access the memory device 110, the memory controller 120 may be configured to perform operations such as the operations described in FIG. 3, to determine the processor core with the higher priority. The controller 120 may then access the memory device 110 using the commands/address generated by the higher priority processor core.

While accessing the memory device 110, the controller 120 may be configured to transfer data from a data bus 901 to a respective data bus 130, and vice versa. The controller 120 may also be configured to assert active signals on the memory control access bus 250, wherein the active signals are derived from the memory access control lines 903. All command and address signals received from the processor cores 920 may be transferred to the memory device 110 via the same CA bus 140, in one embodiment.

In one embodiment of the invention, the memory access control bus 250 may not be included in the system 900. Instead a single chip select signal line may couple the memory controller 120 to the memory device 110. While accessing the memory device 110, the controller 120 may be configured to assert a signal on the chip select line to select the memory device 110. The controller 120 may also be configured to transfer address signals on the CA bus 140. The address signals transferred on the CA bus 140 may be derived from the address signals received via the CA buses 902 and the memory access control lines 903. The address signals transferred on the CA bus 140 may select a section of memory associated with a processor core 920 that is accessing the memory device 110 via the controller 120.

By providing a memory device that may be accessed by a plurality of control units, the number of memory devices included in a system may be reduced, thereby saving power and space.

While the foregoing is directed to embodiments of the present invention, other and further embodiments of the invention may be devised without departing from the basic scope thereof, and the scope thereof is determined by the claims that follow.

What is claimed is:

1. A system comprising:
    a plurality of memory controllers;
    at least one memory device, wherein two or more of the memory controllers are configured to access the at least one memory device via at least one respective data bus;
    at least one command/address (CA) bus that is shared by the plurality of memory controllers; and
    a memory access control bus coupling the plurality of memory controllers with each other and the at least one memory device, wherein, before accessing the CA bus, each of the plurality of memory controllers is configured to determine whether the CA bus is available and, upon determining that the CA bus is available, to transmit a corresponding active signal via the memory access control bus indicating that the shared CA bus is unavailable.

2. The system of claim 1, wherein the CA bus couples the plurality of memory controllers to a respective command/address (CA) port of the at least one memory device, the CA bus being configured to transfer command and address signals from the plurality of memory controllers to the at least one memory device.

3. The system of claim 1, wherein each of the plurality of memory controllers is configured to receive an active signal from each of the remaining memory controllers of the plurality of memory controllers, wherein the received active signal indicates that the CA bus is unavailable.

4. The system of claim 1, wherein each of the plurality of memory controllers is configured to determine whether the CA bus is available by determining if another one of the plurality of memory controllers is asserting a corresponding active signal on the memory access control bus.

5. A method for accessing a memory device by a first controller of a plurality of controllers of a system, comprising:
    determining, by the first controller, whether a shared command/address (CA) bus coupling the plurality of the controllers to the memory device is available;
    upon determining that the CA bus is available, asserting, by the first controller, a first active signal indicating to the plurality of controllers that the CA bus is unavailable, the first active signal being asserted on a memory access control bus coupling the first controller to each of the plurality of controllers and the memory device; and
    accessing the CA bus to transfer command and address signals to the memory device.

6. The method of claim 5, further comprising:
    after asserting the first active signal and before accessing the CA bus, determining whether a second controller has asserted a second active signal;
    upon determining that the second controller has asserted the second active signal, determining whether the second controller has a greater priority than the first controller; and
    upon determining that the second controller has greater priority, deasserting the first active signal generated by the first controller.

7. The method of claim 5, further comprising, one of receiving data from and transferring data to the memory device via a first data bus coupling the first controller to a first data port of the memory device, wherein the memory device comprises a plurality of data ports, each of the plurality of controllers being coupled to a respective one of the plurality of data ports via a respective data bus.

8. The method of claim 5, wherein the memory device is a dynamic random access memory (DRAM).

9. The method of claim 5, wherein the first active signal operates as a chip select signal to select the memory device.

10. A memory controller, comprising:
    a plurality of interfaces configured to couple to (a) a first one of a plurality of data ports of a memory device via a data bus, (b) a shared command/address (CA) bus coupling a plurality of controllers that includes the memory controller to the memory device, and (c) a memory access control bus coupling the memory controller to each of the remaining plurality of controllers and the memory device; and
    control logic configured to:
        determine whether the CA bus is available;
        upon determining that the CA bus is available, assert a first active signal on the memory access control bus indicating to the plurality of controllers that the CA bus is unavailable; and
        access the CA bus to transfer command and address signals to the memory device via the CA bus.

11. The memory controller of claim 10, wherein the control logic is further configured to:
    after asserting the first active signal and before accessing the CA bus, determine whether another controller of the remaining plurality of controllers has asserted a second active signal on the memory access control bus;
    upon determining that the another controller has asserted the second active signal, determine whether the another controller has a greater priority than the memory controller; and
    upon determining that the another controller has greater priority, deassert the first active signal generated by the memory controller.

12. The memory controller of claim 10, wherein the memory controller is configured to receive data from and transfer data to the memory device via the data bus coupling the memory controller to the first data port of the memory device, the memory device comprising a plurality of data ports.

13. The memory controller of claim 10, wherein the memory device is a dynamic random access memory (DRAM).

14. The memory controller of claim 10, wherein the active signal operates as a chip select signal to select the memory device.

15. The memory controller of claim 10, wherein the memory controller comprises a plurality of pins coupled with a plurality of conductive lines of the memory access control bus, wherein the control logic asserts the first active signal on a predefined first pin of the plurality of pins.

16. The memory controller of claim 15, wherein the memory controller receives active signals asserted by the remaining plurality of controllers on each of predefined second pins of the plurality of pins.

17. A system, comprising:
a plurality of controllers;
at least one memory device;
a plurality of data buses, wherein each data bus couples a respective one of the plurality of controllers to a respective data port of the at least one memory device;
a shared command/address (CA) bus coupling the plurality of controllers to the at least one memory device; and
a memory access control bus coupling each of the plurality of controllers to each other and the at least one memory device,
wherein each controller is configured to:
determine whether the CA bus is available;
upon determining that the CA bus is available, assert a corresponding active signal on the memory access control bus indicating to the plurality of controllers that the CA bus is unavailable; and
access the CA bus by transferring command and address signals to the at least one memory device via the CA bus.

18. The system of claim 17, wherein each controller is further configured to:
after asserting the corresponding active signal and before accessing the CA bus, determine whether another controller has asserted another active signal on the memory access control bus;
upon determining that another controller has asserted another active signal, determine whether the another controller has a greater priority than the controller asserting the corresponding active signal; and
upon determining that the another controller has greater priority, deassert the corresponding active signal.

19. The system of claim 17, wherein the at least one memory device is a dynamic random access memory (DRAM).

20. The system of claim 17, wherein the corresponding active signal operates as a chip select signal to select the at least one memory device.

21. The system of claim 17, wherein each controller comprises a plurality of pins coupled with a plurality of conductive lines of the memory access control bus, wherein each controller asserts the corresponding active signal on a predefined first pin of the plurality of pins.

22. The system of claim 21, wherein each controller receives active signals asserted by remaining controllers of the plurality of controllers on each of predefined second pins of the plurality of pins.

23. A system comprising:
a plurality of memory controllers;
at least one memory package comprising a plurality of memory devices,
wherein each of the plurality of memory controllers is configured to access a respective one of the plurality of memory devices in the package, each memory controller being coupled with the memory package via a respective data bus;
at least one command/address (CA) bus that is shared by the plurality of memory controllers; and
a memory access control bus coupling the plurality of memory controllers with each other and the at least one memory package, wherein, before accessing the CA bus, each of the plurality of memory controllers is configured to determine whether the CA bus is available and, upon determining that the CA bus is available, to transmit a corresponding active signal via the memory access control bus indicating that the shared CA bus is unavailable.

24. The system of claim 23, wherein the plurality of memory devices are stacked.

25. The system of claim 23, wherein the memory package is configured to receive an active signal from each of the plurality of memory controllers via the memory access control bus, thereby indicating a memory device of the plurality of memory devices that is to be accessed.

26. The system of claim 23, wherein each of the plurality of memory devices is associated with a predefined data bus coupled with the memory package, each memory device being configured to exchange data signals with a respective predefined data bus.

27. The system of claim 23, wherein the plurality of memory controllers are coupled to a command/address (CA) port of the memory package via the CA bus, the CA bus being configured to transfer address and command signals from the plurality of memory controllers to the memory package.

28. The system of claim 27, wherein the address and command signals are transferred to each of the plurality of memory devices in the memory package.

* * * * *